United States Patent [19]

Losic et al.

[11] Patent Number: 4,990,001
[45] Date of Patent: Feb. 5, 1991

[54] SYNTHESIS OF DRIVE SYSTEMS OF INFINITE DISTURBANCE REJECTION RATIO AND ZERO-DYNAMICS/INSTANTANEOUS RESPONSE

[76] Inventors: Novica A. Losic, 7802-23 Avenue, Kenosha, Wis. 53140; Ljubomir Dj. Varga, Deskaseva 6, 11000 Beograd, Yugoslavia

[21] Appl. No.: 468,122

[22] Filed: Jan. 22, 1990

[51] Int. Cl.$^5$ ............................................. H02P 7/00
[52] U.S. Cl. .................................... 388/811; 388/815; 318/811; 318/812
[58] Field of Search ................................ 323/285–287; 363/21, 97, 606; 318/615–618, 650, 825–829, 830–831, 806, 811, 798, 807, 812; 388/809–815

[56] References Cited

U.S. PATENT DOCUMENTS

| | | | |
|---|---|---|---|
| 4,293,812 | 10/1981 | Kubuch et al. | 323/286 |
| 4,456,872 | 6/1984 | Froeschle | 323/286 |
| 4,459,534 | 7/1984 | Nagase et al. | 318/811 X |
| 4,578,631 | 3/1986 | Smith | 327/282 |
| 4,617,675 | 10/1986 | Aohikaga et al. | 318/811 X |
| 4,672,518 | 6/1987 | Murdock | 363/21 |
| 4,779,183 | 10/1988 | Motch et al. | 318/811 X |
| 4,876,494 | 12/1989 | Daggett et al. | 318/568.22 |
| 4,885,674 | 12/1989 | Varga et al. | 363/97 X |

Primary Examiner—William M. Shoop, Jr.
Assistant Examiner—D. Martin

[57] ABSTRACT

A method of synthesizing drive systems, including dc, synchronous and asynchronous ac, and step motor drive systems, of instantaneous response and zero error in both transient and steady state with respect to an input command and of infinite disturbance rejection ratio with respect to a load torque changes, comprising an inner positive current feedback of exactly specified nature and value of its transfer function forcing the motor impedance to zero for load independence, and further comprising control functions in a direct paths with respect to both position and velocity feedback loop and in a feedforward path of exactly specified values which, together with the inner positive current feedback loop, provide for the zero-dynamics system transfer function with respect to the command with an associated instantaneous response.

9 Claims, 1 Drawing Sheet

FIG. 1

SYNTHESIS OF DRIVE SYSTEMS OF INFINITE DISTURBANCE REJECTION RATIO AND ZERO-DYNAMICS/INSTANTANEOUS RESPONSE

FIELD OF THE INVENTION

This invention relates to electric motor drive systems, including dc, synchronous and asynchronous ac, and step motor drive systems using an inner current feedback loop, both position and velocity feedback loops, and a direct-paths as well as a feedforward-path control functions to control the output angular position and velocity of the motor shaft when either a load torque or an input command changes by making the system of infinite disturbance rejection ratio and zero-dynamics/instantaneous response.

BACKGROUND OF THE INVENTION

In the field of drive systems it is of interest to minimize the effects of load changes as well as to follow an input command, in terms of either velocity or position, as close as possible in both transient and steady state and under all load conditions within the physical limitations of a system. Theoretically, both of these objectives may be achieved using a negative feedback control theory and employing an infinite gain in the loop. The problem encountered in such a case is that the system will necessarily become unstable so that, with this classical approach, no solution can be achieved. As a matter of fact, this remains a classical problem in system and control theory and practice.

An infinite disturbance rejection ratio, i.e., load independence, has been achieved employing a positive feedback as described in the U.S. Pat. application No. 07/323,630, filed November 1988 and entitled "Synthesis of Load-Independent DC Drive System" by these same two inventors N. A. Losic and Lj. Dj. Varga, and in the U.S. patent application No. 07/316,664, February 1989, by N. A. Losic and Lj. Dj. Varg entitled "Synthesis of Load-Independent AC Drive Systems" and allowed for issuance December 1989. The inventions have been generalized and included synthesis of a load-independent step motor drive systems in a copending and coassigned application by Lj. Dj. Varga and N. A. Losic, "Synthesis of Zero-Impedance Converter" filed December 1989.

Furthermore, a synthesis of drive systems of infinite disturbance rejection ratio and zero-order dynamics and without the use of position and velocity feedbacks is described in a copending and coassigned application by N. A. Losic and Lj. Dj. Varga, "Synthesis of Improved Zero-Impedance Converter", December 1989.

SUMMARY OF THE INVENTION

It is therefore an object of the present invention to provide a synthesis method to produce infinite disturbance rejection ratio and zero-order dynamics in electric motor drive systems with any kind of motor including dc, synchronous and asynchronous ac, and step motors, and with both position and velocity loop closed. As it will be shown in the detailed description, the algorithms that hold for the preferred embodiment of the present invention are thus independent of a combined transfer function of a stabilizing and control circuit located in a forward path of the embodiment.

Briefly, for use with an electric motor drive system, the preferred embodiment of the present invention includes a positive current feedback loop within a negative position and velocity feedback loops, and further includes control functions in a direct paths with respect to both position and velocity feedback loop and in a feedforward path. The positive current feedback loop comprises a current feedback circuit whose transfer function is H(s) given as $$H(s) = Z_{ekv}(s)/RAK \quad (1)$$

where $Z_{ekv}(s)$ is the impedance of an electric motor, R is transresistance of a current sense device, A is voltage gain of a pulse width modulation (PWM) control and power stage, and K is gain constant of a buffering amplifier in the current loop.

The control function in direct path with respect to the position feedback loop is implemented as a position direct path circuit characterized by a gain constant $$K_i = mK_e K_g \quad (2)$$

where m is a constant providing scaling between input and output of the system, i.e., the system transfer function becomes equal to m, $K_e$ is digital encoder gain constant in [pulses/radian], and $K_g$ is gear ratio of a gear box mounted between motor shaft and the encoder.

The control function indirect path with respect to the velocity feedback loop is implemented as a velocity direct path circuit characterized by a gain constant $$K_i' = mK_v \quad (3)$$

where $K_v$ is tach gain constant in [Volts/rad/sec].

The control function in the feedforward path is implemented as a feedforward circuit characterized by a gain constant $$K_i' = mK_m/A \quad (4)$$

where $K_m$ is a constant characterizing counter (back) electromotive force (emf) mechanisms of an electric motor with a constant air-gap flux; the back emf of such a motor is proportional to angular shaft speed where the proportionality constant $K_m$ is in [Volts/rad/sec].

The positive current feedback incorporating the current feedback circuit of transfer function H(s) of Eq.(1), forces the motor impedance to zero yielding a load independence, i.e., an infinite disturbance rejection ratio, and further reduces the order of a system transfer function. The system transfer function is then brought to a zero-order function, i.e., constant m, for the control functions in direct paths and in feedforward path given in Eqs.(2), (3), and (4), respectively, yielding a zero-dynamics/instantaneous response with respect to an input command with associated zero error in both transient and steady state.

Other advantages of the present invention include its ability to be realized in an integrated-circuit form; the provision of such a method which provides independence on a transfer function of a circuits located in a forward path of the embodiment; the provision of such a method which provides zero output-angular-velocity/position-change-to-load-torque-change transfer function in both steady state and transient; and the provision of such a method which provides constant output-angular-velocity/position-change-to-input-command/reference-change transfer function in both steady state and transient.

As indicated in Eq.(1), the circuit realization of the current feedback circuit in the positive current feedback loop is a direct and explicit function of the impedance of an electric motor, $Z_{ekv}(s)$. The two control functions in direct paths as well as the control function in feedforward path, as indicated in Eqs.(2), (3), and (4), are realized as a constant-gain circuits.

The algorithm of Eq.(1) operates independently of an equivalent circuit of electric motor (the equivalent circuit incorporating mechanisms of producing both torque and back emf in the motor); it uses only information about the motor equivalent impedance, $Z_{ekv}(s)$. The algorithms of Eqs.(2) and (3) are also independent of a motor equivalent circuit while the algorithm in Eq.(4) needs knowledge only about back electromotive force production. All of the algorithms, given in Eqs.(1)-through (4), are independent on a system moment of inertia, and thus on a mass, as well as on a viscous friction coefficient, implying infinite robustness of a drive system with respect to the mechanical parameters, of course, within physical limitations of the system. This implies a possibility of simplification in controlling a high-performance electric motor drive system by simplifying a control algorithms used and, at the same time, achieving an infinite disturbance rejection ratio and a zero-dynamics/instantaneous response, the performance characteristics not previously attained.

These and other objects and advantages of the present invention will no doubt be obvious to those skilled in the art after having read the following detailed description of the preferred embodiment which is illustrated in the FIGURE of the drawing.

DETAILED DESCRIPTION

Figure 1:
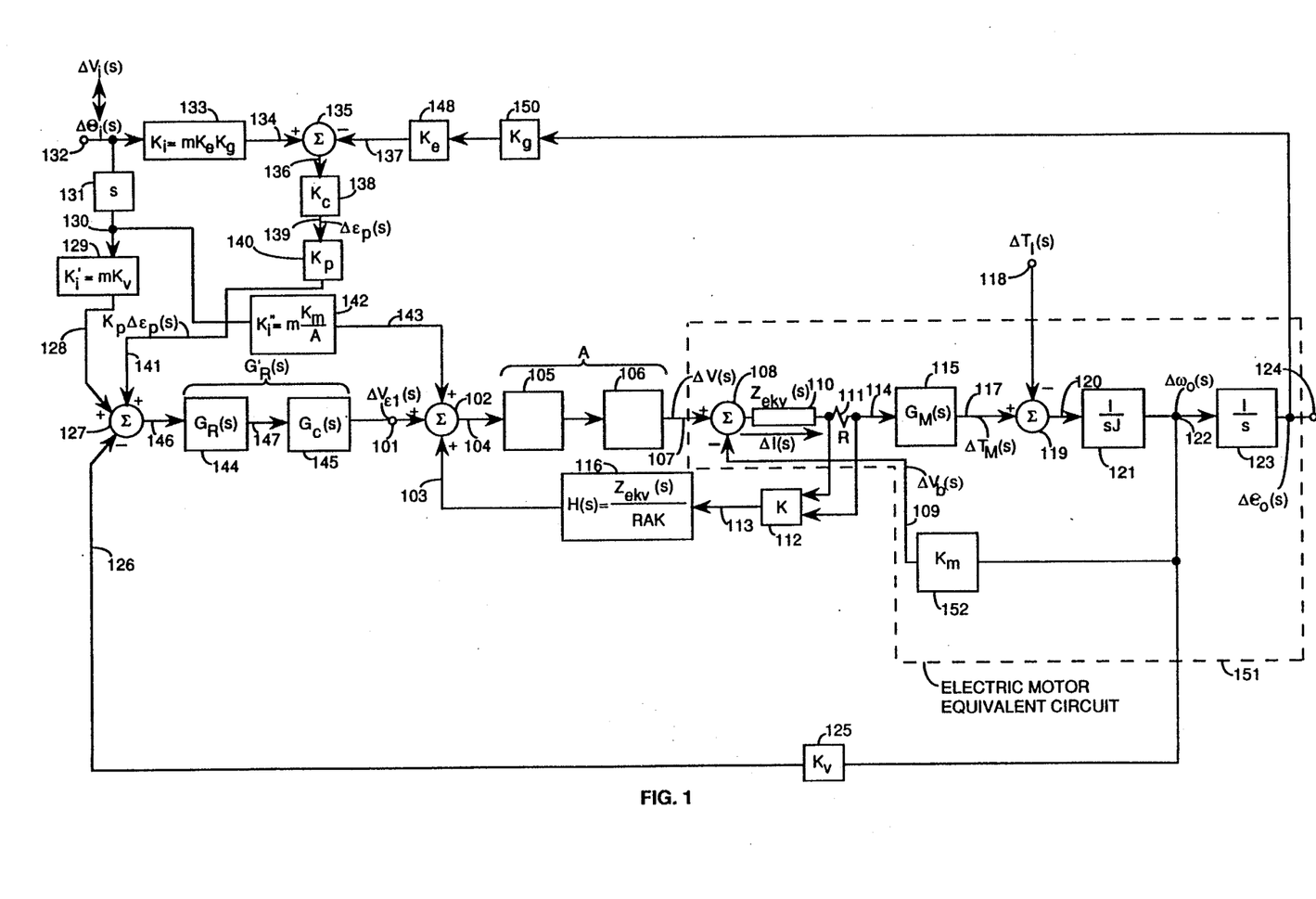
FIG. 1 is a block and schematic diagram of the preferred embodiment of the invention.

An electric motor drive system embodying the principles of the invention whereby featuring an infinite disturbance rejection ratio and zero-dynamics/instantaneous response is shown in FIG. 1. In FIG. 1, it is assumed that input voltage $V_{in}$ (not illustrated) applied to a pulse width modulated (PWM) power stage 106 is constant so that an overall voltage gain constant A characterizes combined transfer function of the PWM control stage 105 and power stage 106. The power stage 106 is implemented appropriately for the kind of motor which it powers; for example, it may be a dc-to-dc converter for dc motors or dc-to-ac converter for ac motors or a PWM power stage employed for driving step motors (in this latter case some additional circuits may be used without affecting the properties of the embodiment). The PWM control circuit 105 then performs appropriate control function and drives the power stage 106. What is of interest here is that the overall voltage gain of the control and power stage is a constant A. Thus, a signal applied to lead 104 is voltage-amplified A times to appear as voltage $\Delta V(s)$ on lead 107 with an associated power/current $\Delta I(s)$ supplied by the input voltage source $V_{in}$.

The embodiment in FIG. 1 employs a positive current feedback loop within a negative feedback velocity and position loops and further employs a control functions in a direct paths with respect to both position and velocity feedback loop and in a feedforward path. The positive current feedback loop incorporates a current feedback circuit 116 whose transfer function is H(s). Either analog or digital (microprocessor) realization of the current feedback circuit 116 may be done. The purpose of the positive current feedback loop is to make the system of infinite disturbance rejection ratio, i.e., to provide load independence, which it does for the transfer function H(s) synthesized as given in Eq.(1)and shown in FIG. 1 as it will be explained shortly. The purpose of negative velocity and position feedback loops is to stabilize the system and control its dynamics by means of a stabilizing network 144 and a control block 145. Another purpose of the two negative feedback loops is to provide(varying) dc feedback voltages in closing the loops, i.e., on leads 126 and 141, without additional filtering necessary, for example, in cases in which a negative voltage feedback loop is closed taking the PWM voltage supplied to the motor $\Delta V(s)$ and feeding it back in a negative loop. Although the position and velocity feedback loops then require appropriate feedback sensing devices, e.g. digital encoder and tach, they further provide a benefit of independence of the algorithms of the embodiment, given in Eqs.(1)through (4), of a combined transfer function of the circuits located in the forward path of the system, i.e., of the circuits 144 and 145 whose individual transfer functions are $G_R(s)$ and $G_c(s)$, respectively, and combined transfer function is $G_R'(s)$.

The control function in direct path with respect to the position feedback loop incorporates a position direct path circuit 133 of a constant gain $K_i$. The control function in direct path with respect to the velocity feedback loop incorporates a velocity direct path circuit 129 of a constant gain $K_i'$. Finally, the control function in the feedforward path incorporates a feedforward circuit 142 of a constant gain $K_i''$. The purpose of these three control functions is to, together with the positive current feedback loop, bring the system transfer function to a zero-order one, i.e., to a constant m, which they do for the gains $K_i$, $K_i'$, and $K_i''$ synthesized as given in Eqs.(2), (3), and (4), respectively, thereby providing a zero-dynamics/instantaneous response with respect to the input command with associated zero error in both transient and steady state.

In operation, the current $\Delta I(s)$ through an electric motor impedance 110 of value $Z_{ekv}(s)$ is sensed by a current sense device 111 whose transresistance is R. The electric motor impedance 110 is a series connection of a resistance and an inductive reactance in case of a dc, synchronous ac, and step motors. In case of asynchronous ac motor (induction motor) this impedance consists of a series connection of a stator impedance and an impedance obtained as a parallel connection of a magnetizing reactance and a rotor impedance referred to stator. The current $\Delta I(s)$ provides a motor developed torque $\Delta AT_M(s)$ by means of a torque producing mechanisms represented by a block 115 of transfer function $G_M(s)$. In case of n-phase motors, a total current $\Delta I(s)$ is understood to be on lead 114 as an input to block 115, and the portion of the system employing the positive current feedback loop, i.e., the portion of the system between leads 101 and 114, is assumed to be per-phase based. The Laplace-transformed function $G_M(s)$ is used to denote the torque producing mechanisms of any electric motor even though in some motors these mechanisms are nonlinear. The justification for the linearized model of block 115 is in that the function $G_M(s)$ does not play any role in functioning of the algorithms of the preferred embodiment of FIG. 1 as it will be shortly derived and as shown in the summary of the invention in Eqs.(1)through (4). The motor developed torque $\Delta T_M(s)$, available on lead 117, is opposed by a load torque $\Delta T_l(s)$, supplied externally at point 118. This opposition takes place in an algebraic summer 119. The difference between the two torques, $\Delta T_M(s) - \Delta T_l(s)$, is supplied by lead 120 to a block 121 which denotes transformation from a torque to an angular shaft speed, and whose transfer function is $1/sJ$, where J is a system moment of inertia. Normally, block 121 has a transfer function $1/(sJ+B)$ where B is a viscous friction coefficient. However, as it will be shortly shown, the algorithms of the embodiment, given previously in Eqs.(1)-through (4), are independent on the contents of the block 121 in terms of the mechanical parameters characterizing it, i.e., an independence on both system moment of inertia J and viscous friction coefficient is achieved, implying infinite robustness of the system in FIG. 1 with respect to the mechanical parameters. An angular shaft speed $\Delta\omega_o(s)$ is produced at point 122 while an angular shaft position $\Delta\theta_o(s)$ is produced, integrating the speed in block 123, at point 124. A counter (back) electromotive force (emf) $\Delta V_b(s)$ is produced on lead 109 opposing a voltage applied to the motor $\Delta V(s)$ available at point 107. This opposition is represented by subtracting the back emf from the voltage applied to the motor in an algebraic summer 108. For a constant air-gap flux in an electric motor, regardless of the type of motor, the back emf is produced in proportion to the angular speed where the proportionality constant is $K_m$ of a block 152. The portion within broken line in FIG. 1, referred to with numeral 151, represents an electric motor equivalent circuit where $G_M(s)$ denotes a torque production mechanisms on the basis of a current supplied to the motor and $K_m$ denotes a back emf production mechanisms for constant air-gap flux. It should be understood that the back emf results into a reduced dc voltage applied to the motor impedance $Z_{ekv}(s)$ in case of a dc motor and, in cases of ac and step motors, it reduces a peak-to-peak, and thus rms, voltage applied to the motor impedance $Z_{ekv}(s)$. The angular shaft speed $\Delta\omega_o(s)$ and position $\Delta\theta_o(s)$ are monitored by tach 125, characterized by a gain constant $K_v$[V/rad/sec], and encoder 148, characterized by a gain constant $K_e$[pulses/rad], respectively. In general, a gear box may be used in the position loop; a block 150, characterized by a gear ratio constant $K_g$, denotes a gear box in FIG. 1. The velocity and position feedback signals may alternatively be derived from a single feedback measuring device by appropriate differentiation/integration, without changing the principles of operation of the embodiment. The angular shaft speed $\Delta\omega_o(s)$ is monitored by tach 125 and a velocity feedback signal is applied by lead 126 to summer 127 to close the negative feedback loop. The velocity command voltage, obtained by differentiating and multiplying by a constant $K_i'$ the position command $\Delta\theta_i(s)$, is applied by lead 128 to the summer 127. The differentiation of the position command $\Delta\theta_i(s)$ is performed in a block 131 while a velocity direct path circuit 129 multiplies the velocity signal voltage available at point 130, to provide the velocity command voltage on lead 128. The position command $\Delta\theta_i(s)$ applied at point 132 is processed by a position direct path circuit 133 of a constant gain transfer function $K_i$ and applied to an algebraic summer 135 by means of lead 134. The signal on lead 134 is in a form of pulses whose number corresponds to the commanded angular shaft position. In that sense, the velocity signal voltage at point 130 corresponds to the rate of the position command pulses. The algebraic summer 135 is used to functionally represent a digital counter within a phase/frequency detector which counts in opposite directions position feedback pulses supplied by lead 137 and position command pulses supplied by lead 134 into the counter.

A number of pulses corresponding to the position error is supplied by lead 136 to a D/A converter 138 whose gain is $K_c$[V/pulses] and whose output 139 provides the position error $\Delta\epsilon_p(s)$ in an analog form. Block 140, characterized by a constant $K_p$, represents a gain constant in the position loop so that a position error voltage $K_p\Delta\epsilon_p(s)$ is provided at the output of block 140 and supplied by means of lead 141 to the algebraic summer 127. The algebraic summer adds the velocity command voltage, available on lead 128, in a positive manner to the position error voltage, available on lead 141, and subtracts from this sum the velocity feedback signal, available on lead 126. Thus, at the output of the algebraic summer 127 a resulting error voltage is available and is brought by means of lead 146 to a stabilizing network 144 characterized by transfer function $G_R(s)$. The output of the stabilizing circuit is applied by lead 147 to a control circuit 145 characterized by transfer function $G_c(s)$. The control circuit 145 produces at its output 101 a control signal $\Delta V_{el}(s)$. The control signal $\Delta V_{el}(s)$ is added in a positive manner to a feedforward signal, available on lead 143, in a summer 102. The feedforward signal on lead 143 is available at the output of a feedforward circuit 142 characterized by a gain constant $K_i''$ which is fed at its input by the velocity signal voltage, available at point 130. It should be understood that the feedforward signal increases a dc voltage applied to the motor impedance $Z_{ekv}(s)$ in case of a dc motor and, in cases of ac and step motors, it increases a peak-to-peak, and thus rms, voltage applied to the motor impedance $Z_{ekv}(s)$, i.e., the feedforward signal opposes action of the back emf $\Delta V_b(s)$.

The voltage representative of a motor current, $R\Delta I(s)$, is buffered by a differential amplifier 112 whose gain constant is K. The output of the isolating/buffering amplifier 112 is connected via lead 113 to a current feedback circuit 116 whose transfer function is $H(s)$. The current sense signal obtained and processed in this way is then added in summer 102 in the positive feedback manner via lead 103 to the control signal $\Delta V_{\Delta l}(s)$, available on lead 101, and to the feedforward signal, available on lead 143. The resulting total control signal, obtained by summing in the positive feedback manner the current sense signal, processed by the current feedback circuit 116, with both control and feedforward signal, is applied by lead 104 to a pulse width modulation (PWM) control circuit 105 which in turn controls and drives a PWM power stage 106. The combined voltage gain of control stage 105 and power stage 106 is a constant Thus, a voltage $\Delta V(s)$ is applied via lead 107 to the motor creating motor current $\Delta I(s)$ through the motor equivalent impedance $Z_{ekv}(s)$.

The implementation of the PWM control 105 and power stage 106 is irrelevant for the functioning of the preferred embodiment of FIG. 1. It is only the overall voltage gain A of these two blocks which is involved in the algorithms of the preferred embodiment of FIG. 1. It is understood that signals associated with the summing circuit 102 are compatible in that they are: a dc varying signals in case of a dc motor; a sinusoidal signals of the same frequency in case of an ac motor; and a pulse signals of the same rate in case of a step motor (which produces an angular shaft speed $\Delta\omega_o(s)$ proportional to this rate of pulses). The voltage supplied to the motor $\Delta V(s)$ is in a pulse width modulated form whose average value corresponds to a voltage seen by a dc motor; its fundamental component corresponds to a sinusoidal voltage seen by an ac motor; and its pulses waveform, free of the actual pulse width modulation, is seen by a step motor.

The scaling factor m in blocks 133, 129, and 142 has units in [radian/Volt] for a voltage command $\Delta V_i(s)$ actually representing the position command $\Delta\theta_i(s)$ in response to which an angular shaft position $\Delta\theta_o(s)$ is reached, i.e., $\Delta V_i(s) \leftrightarrow \Delta\theta_i(s)$, and, as it will be shown shortly for the preferred embodiment of FIG. 1, a zero-order transfer function is provided, i.e., $\Delta\theta_o(s)/\Delta\theta_i(s) = m$. As previously indicated, gain constants $K_v$ and $K_e$ are dimensioned in [V/rad/sec] and in [pulses/rad], respectively. Since the back emf constant $K_m$ has units in [V/rad/sec], and gain constants A and $K_g$ are dimensionless, the gain constants of blocks 133, 129, and 142, are dimensioned as $K_i$[pulses/V], $K_i'$[sec], and $K_i''$[sec]i, respectively. The differentiation of the voltage command $\Delta V_i(s)$, performed in block 131, has units in [1/sec] so that the velocity signal voltage, available at point 130, is expressed in [V/sec] for the voltage command $\Delta V_i(s)$, applied to point 132, expressed in Volts. Thus the outputs of the blocks 133, 129, and 142, are in pulses (lead 134), Volts (lead 128), and Volts (lead 143). As explained earlier, the position error voltage available on lead 141 is in analog form and is also expressed in Volts. The current feedback circuit 116, characterized by a transfer function that will shortly be derived and shown in the preferred embodiment of FIG. 1 as $H(s) = Z_{ekv}(s)/RAK$ which is dimensionless, is a voltage-gain circuit.

The electric motor equivalent impedance 110 is a series connection of a resistance $R_{ekv}$ and an inductive reactance $sL_{ekv}$ in case of dc, synchronous ac, and step motors $$Z_{ekv}(s) = R_{ekv} + sL_{ekv} \quad (5)$$

while in case of an asynchronous ac (induction) motor the equivalent impedance 110 is a series connection of a stator impedance $(R_{st} + sL_{st})$ and an impedance obtained as a parallel connection of a magnetizing reactance $sL_m$ and a rotor impedance referred to stator $(R_{rs} + sL_{rs})$ $$Z_{ekv}(s) = (R_{st} + sL_{st}) + sL_m \parallel (R_{rs} + sL_{rs}) \quad (6)$$

The dynamic stiffness of the system of FIG. 1 is, for $R << |Z_{ekv}(s)|$ $$-\Delta T_1(s)/\Delta\theta_o(s) = [T_1(s) + T_2(s) + T_4(s)]/T_3(s) \quad (7)$$

where $$T_1(s) = G_M(s)G_R'(s)A(K_gK_eK_cK_p + sK_v) \quad (8)$$

$$T_2(s) = s^2JT_3(s) \quad (9)$$

$$T_3(s) = Z_{ekv}(s) - H(s)RAK \quad (10)$$

$$T_4(s) = G_M(s)sK_m \quad (11)$$

The transfer function of the preferred embodiment of FIG. 1, for $R << |Z_{ekv}(s)|$ and $K_1'' = 0$, is $$\Delta\theta_o(s)/\Delta\theta_i(s) = [T_1'(s) + T_4'(s)]/[T_1(s) + T_2(s) + T_4(s)] \quad (12)$$

where $$T_1'(s) = G_M(s)G_R'(s)AK_iK_cK_p \quad (13)$$

$$T_4'(s) = G_M(s)G_R'(s)AsK_i' \quad (14)$$

Denoting a part of the output angular shaft position response due to the input position command in Eq.(12) $\Delta\theta_{oi}(s)$, and a part of the output angular shaft position response due to the load torque disturbance in Eq.(7) $\Delta\theta_{ol}(s)$, the disturbance rejection ratio of the preferred embodiment of FIG. 1 is $$D_{rr}(s) = \Delta\theta_{oi}(s)/\Delta\theta_{ol}(s) = \{[T_1'(s) + T_4'(s)][\Delta\theta_i(s)]\}/\{T_3(s)[-\Delta T_1(s)]\} \quad (15)$$

Combining Eqs.(15) and (10) it is seen that for the transfer function of the current feedback circuit as given in Eq.(1) and repeated here $$H(s) = Z_{ekv}(s)/RAK \quad (16)$$

the disturbance rejection ratio becomes infinite, i.e., $$D_{rr}(s) = \infty \quad (17)$$

In addition to providing an infinite disturbance rejection ratio, the algorithm of Eq.(16) reduces the order of the system transfer function originally given in Eq.(12), as seen by substituting Eq.(16) into Eq.(10) and then Eq.(10) into Eq.(9) so that $T_2(s) = T_3(s) = 0$ yielding for the system transfer function $$\Delta\theta_o(s)/\Delta\theta_i(s) = G_o[1 + s\tau_z]/[1 + sT_p(s)] \quad (18)$$

where $$G_o = K_i/K_gK_e \quad (19)$$

$$\tau_z = K_i'/K_iK_cK_p \quad (20)$$

$$T_p(s) = G_R'(s)AK_v + K_m]/[G_R'(s)AK_gK_eK_cK_p \quad (21)$$

From Eq.(18) the zero dynamics is achieved for $$\tau_z = T_p(s) \quad (22)$$

which implies that time constant $\tau_z$ should become a function of s. By setting c a gain constant $K_i'$, which characterizes the velocity direct path circuit 129, a function of s, the zero dynamics, achieved for the condition of Eq.(22), is obtained by substituting Eqs.(20) and (21) into Eq.(22) yielding $$K_i'(s)/K_i + ]G_R'(s)AK_v + K_m]/[G_R'(s)AK_gK_e] \quad (23)$$

in which case the system transfer function of Eq.(18) becomes $$\Delta\theta_o(s)/\Delta\theta_i(s) = G_o \quad (24)$$

The condition for zero dynamics, as given in Eq.(23), can be resolved in two independent conditions, one for position and another for velocity loop, by synthesizing the respective gain constants as given in Eq.(2) and here $$K_i = mK_eK_g \quad (25)$$

and $$K_i'(s) = mK_v + mK_m/G_R'(s)A \qquad (26)$$

in which case Eq.(24) becomes $$\Delta\theta_o(s)/\Delta\theta_i(s) = m \qquad (27)$$

The zero-order dynamics provided in Eq.(27) implies instantaneous response to an input command with associated zero error in both transient and steady state. The condition in Eq.(26) is simply implemented, with reference to the system block diagram in FIG. 1 and remembering that it was derived for $K_i'' = 0$, by implementing the velocity direct path circuit 129 such that it is characterized by a gain constant given in Eq.(3) and repeated here $$K_i' = mK_v \qquad (28)$$

and by implementing the feedforward circuit 142 such that it is characterized by a gain constant given in Eq.(4) and here $$K_i'' = mK_m/A \qquad (29)$$

The condition in Eq.(16) therefore provided for infinite disturbance rejection ratio, resulting into Eq.(17), and the conditions in Eqs.(16), (25), (28) and (29) provide for zero-dynamics/instantaneous response, resulting into Eq.(27).

It is well known in classical control theory that both properties claimed above, i.e., an infinite disturbance rejection ratio and a zero-order dynamics with associated instantaneous response, can be achieved only for an infinite loop gain in the system of interest, i.e., by providing a block of infinite gain topologically located in the loop before the point of entry of disturbance. However, long before approaching any infiniteness in its loop gain such a system would become unstable and therefore useless. The instability is due to nonzero time constants, associated with the plant, i.e., the object of control, which cause phase shifts which at some frequencies will accumulate so that, together with a 180° phase shift in a negative feedback loop, the total phase shift will equal 360° = 0° which, for loop gains greater than one, creates unstable system.

In modern control theory the problem basically remains the same. We will cite at this point a portion of a paragraph from the book "Feedback Control Systems" by Charles L. Phillips and Royce D. Harbor, Prentice Hall, 1988. specifically from section "Pole-Placement Design" dealing with the concluding remarks on page 518. The citation is: "It appears from the preceding example that we can choose the magnitude of the real part of the roots arbitrarily large, making the system response arbitrarily fast. For the system model, we can do this. However, as the time constant of the system becomes smaller, the gains increase. This is true, in general, since to increase the rate at which a plant responds, the input signal to the plant must become larger".

The preferred embodiment of the present invention, as well as patents and copending and coassigned applications, in their own application domains, by these two same inventors, as stated in the background of the invention, works in such a way as to force all system time constants to zero while providing a finite loop gain ensuring a complete stability and achieving ideal properties given in Eqs.(17) and (27). Actually, the embodiment of FIG. 1 possesses a block in the loop which features an infinite gain but the total loop gain is finite! To visualize this better, we shall notice that a transadmittance $\Delta I(s)/\Delta V_{\epsilon 1}(s)$, as a function of interest here, is obtained from FIG. 1 as $$\Delta I(s)/\Delta V_{\epsilon 1}(s) = A/\{(Z_{ekv}(s) + K_m(1/sJ)G_M(s) - H(s)RAK\}$$

while a transfer function $\Delta\omega_o(s)/\Delta V_{\epsilon 1}(s)$, also of interest for this discussion, is obtained from FIG. 1 as $$\Delta\omega_o(s)/\Delta V_{\epsilon 1}(s) = A/\{[(Z_{evk}(s)sJ + K_mG_M(s)Z_{ekv}(s) - H(s)RAK)]/[(s)Z_{eekv}(s)] + +[H(s)RAKK_m]/[Z_{ekv}(s)]\}$$

It is then seen that by substituting the algorithm given in Eq.(16) into above two expressions the transadmittance part due to impedance $[Z_{ekv}(s) - H(s)RAK]$ becomes infinite but it is in series connection with another transadmittance part which is finite and which is due to impedance $[K_m(1/sJ)G_M(s)]$, while the second expression above becomes a finite gain $$\Delta\omega_o(s)/\Delta V_{\epsilon 1}(s) = A/K_m$$

It is therefore clear that any loop gain in the system of FIG. 1 is finite but, at the same time, the system is completely free of any time constants associated with both electric motor impedance $Z_{ekv}(s)$ and mechanical part of the system. A series connection of an infinite and a finite transadmittance part is a finite number equal to the value of the finite transadmittance part which ensures finite loop gains. At the same time, the infiniteness, due to the infinite transadmittance part, has been "utilized" to bring the time constants due to motor impedance to zero also eliminating dependence on the mechanical parameters of the system such as its moment of inertia and viscous friction coefficient. All this has been achieved using the algorithm of Eq.(16). Since the input command to the system is topologically generated at a point from which the signal flow has to pass through another set of time constants, associated with transfer function $G_R'(s)$ describing blocks 144 and 145, the algorithm of Eq.(16) was not able to remove dependency on this set of time constants as well, so that the transfer function of the embodiment became as given in Eq.(18). This necessitated synthesizing the additional three algorithms, given in Eqs.(25), (28) and (29), to bring the system order to zero, as shown in Eq.(27).

Returning to the citation presented earlier, in which it is said that "as the time constant of the system becomes smaller, the gains increase", we note that the preferred embodiment of the present invention in FIG. 1 reduces system time constants exactly to zero while providing quite finite loop gains; the velocity loop gain and the position loop gain being $$LG_v(s) = K_vG_R'(s)(A/K_m)$$

and $$LG_p(s) = K_gK_eK_cK_pG_R'(s)A]s\}$$

respectively, so that transfer function $G_R'(s)$ is simply designed for any desired gain/phase margin. The design of transfer function $G_R'(s)$ is actually very much simplified as the embodiment in FIG. 1 is already made of infinite disturbance rejection ratio and of instantaneous response to the input command due to the algorithms given in Eqs.(16), (25), (28), and (29), all of which are independent of $G_R'(s)$.

The embodiment of FIG. 1 performs in such a way as to be limited only by the physics limitations such as finite energy level of available sources, finite power dissipation capability of available components, and finite speed of transition of control signals.

With regards to a circuit realization of the block 116 in the positive current feedback loop, it is seen from Eqs.(5) and (16) that this block is realized by implementing a differentiator circuit with a dc path in case of dc, synchronous ac, and step motors, while in case of asynchronous ac (induction) motors the circuit realization of block 116 is done in accordance with Eqs.(6) and (16). Therefore, the circuit realization of block 116 is simple and exactly determined by Eqs.(5), (6), and (16). Alternatively, a software implementation, based on implementing Eqs.(5), (6), and (16), can be done in order to realize block of transfer function H(s). As with reference to realizing the other three algorithms of the preferred embodiment of FIG. 1, i.e., the position direct path circuit 133 characterized by a gain constant of Eq.(25), the velocity direct path circuit 129 characterized by a gain constant of Eq.(28), and the feedforward circuit 142 characterized by a gain constant of Eq.(29), they are realized by implementing a constant gain circuits in accordance with Eqs.(25), (28), and (29).

Various changes and modifications may be made, within the scope of the inventive concept without departing from it.

For example, only velocity feedback may be employed and the same properties of the embodiment are preserved using algorithms in Eqs.(16),(positive current feedback is always employed), (28), and (29). In another example, the algorithms in Eqs.(28) and (29) are implementable as well by implementing Eq.(26). In yet another example, if the back emf mechanisms are characterized by a more complex function than the constant $K_m$, valid for a constant air-gap flux in any electric motor, that function would replace constant $K_m$ in Eq.(29) and, of course, in Eq.(26), and the same properties of the embodiment would be preserved.

Also, the conceptual employment of the scaling constant m in both position and velocity direct path circuits 133 and 129, and in the feedforward circuit 142, producing for the system transfer function the constant m, as given by Eq.(27), may not be feasible in practical terms in cases in which this employment would cause voltage levels in the signal portion of the system higher than normally assumed, i.e., voltages at the outputs of blocks 133, 129, and 142 would be, in those cases, higher than normally expected. This problem is easily solved by moving the scaling constant m from blocks 133, 129, and 142 to the pulse width modulation power stage 106, where the voltage levels can assume the expected values. In order for this to be done, the loop gains involving the voltage gain of the PWM control and power stage must, of course, be kept the same. This is easily done by dividing gain constant of block 112 with m, if the gain constant A is to be multiplied by m. Therefore, in such a case, the preferred embodiment of FIG. 1 may easily be changed, without affecting any of the properties obtained here, to accommodate for reasonable voltage levels in the signal and control portion of the system, by: changing gain of the position direct path circuit 133 from $K_i = mK_eK_g$ to $K_i' = K_eK_g$; changing gain of the velocity direct path circuit 129 from $K_i' = mK_v$ to $K_i' = K_v$; changing gain of the feedforward circuit 142 from $K_i'' = mK_m/A$ to $K_i'' = K_m/A$; changing gain of the PWM control and power stage from A to mA; and changing gain of isolating/differential amplifier 112 from K to K/m. Finally, in velocity loop the gain constant $K_v$ of tach 125 is to be changed to $K_v/m$ while in the position loop any one of the gain constants characterizing blocks 150, 148, 138, and 140 should be divided by m; for example, the gain constant $K_p$ of the block 140 should become $K_p/m$.

We claim:

1. A method for synthesizing electric motor drive system of infinite disturbance rejection ratio and zero dynamics comprising:

accepting a source of electrical energy of a constant voltage at an input to a power converter, coupling mechanically a shaft of an electric motor to a load to be driven at an output, controlling a power flow from said input to said output, modulating said power converter for the control of said power flow in a pulse width modulation manner, supplying a total control signal for modulating said power converter, supplying position feedback pulses, feeding back said position feedback pulses and comparing their frequency and phase with frequency and phase of position command pulses in a phase frequency detector in a negative feedback manner; thereby producing a position error voltage proportional to a difference in frequency and phase between said position command pulses and said position feedback pulses;

supplying a position command obtained as a voltage potential, passing said position command through a position direct path circuit; thereby producing said position command pulses, passing said position command through a differentiation circuit; thereby producing a velocity signal voltage, passing said velocity signal voltage through a velocity direct path circuit; thereby producing a velocity command voltage, passing said velocity signal voltage through a feedforward circuit; thereby producing a feedforward signal, supplying a velocity feedback signal, feeding back said velocity feedback signal and summing it with said velocity command voltage and said position error voltage in a negative feedback manner; thereby producing a resulting error voltage, passing said resulting error voltage through a cascade connection of a stabilizing network and a control circuit; thereby producing a control signal proportional to the algebraic sum of said velocity command voltage and said velocity feedback signal and said position error voltage, sensing a current through said electric motor, feeding back the sensed current signal through a current feedback circuit in a positive feedback loop with respect to said control signal and said feedforward signal and summing the sensed current signal with said control signal and said feedforward signal, supplying said total control signal, obtained as the sum of said control signal and said feedforward signal and the current signal fed through said current feedback circuit, for modulating said power converter for the control of the flow of power from the input electrical source to the output mechanical load, whereby all electrical and mechanical time constants associated with said electric motor and with the mechanical load are brought to zero yielding an infinite disturbance rejection ratio by making an angular shaft position and speed independent of said load and yielding a zero dynamics by cancelling remaining time constants in the system and making a transfer function from said position command to said angular shaft position a constant and therefore of zero dynamics.

2. The method of claim 1 wherein said current feedback circuit in said positive feedback loop is synthesized using an equation providing transfer function in laplace domain of said current feedback circuit $$H(s) = Z_{ekv}(s)/RAK$$

in said equation $Z_{ekv}(s)$ being an impedance of said electric motor, R being a transresistance of a motor current sense device, A being a voltage gain of a pulse width modulation control and power stage, K being a voltage gain of a buffering differential amplifier, and s being a complex frequency laplace variable in the transfer function H(s).

3. The method of claim 2 wherein said equation providing transfer function of said current feedback circuit is physically implemented, thereby implementing said current feedback circuit, in case of the direct current motors, or the alternating current synchronous motors, or the step motors, in accordance with an expression giving said impedance of said electric motor in laplace domain $Z_{ekv}(s)$ as a series connection of a resistance and an inductive reactance of said electric motor, and, in case of the alternating current asynchronous motors, in accordance with another expression giving said impedance of said electric motor in laplace domain $A_{ekv}(s)$ as a series connection of a stator impedance with a parallel connection of a magnetizing reactance and a rotor impedance referred to stator of said electric motor.

4. The method of claim 1 wherein said position direct path circuit is synthesized using an equation providing transfer function of said position direct path circuit $$K_i = mK_eK_g$$

in said equation m being a scaling constant equal to said transfer function from said position command to said angular shaft position, $K_e$ being a gain constant of a digital encoder, and $K_g$ being a gear ratio constant of a gear box.

5. The method of claim 4 wherein said equation providing transfer function of said position direct path circuit is physically implemented, thereby implementing said position direct path circuit, as a constant gain circuit.

6. The method of claim 1 wherein said velocity direct path circuit is synthesized using an equation providing transfer function of said velocity direct path circuit $$K_i' = mK_v$$

in said equation m being a scaling constant equal to said transfer function from said position command to said angular shaft position, and $K_v$ being a gain constant of a tach.

7. The method of claim 6 wherein said equation providing transfer function of said velocity direct path circuit is physically implemented, thereby implementing said velocity direct path circuit, as a constant gain circuit.

8. The method of claim 1 wherein said feedforward circuit is synthesized using an equation providing transfer function of said feedforward circuit $$K_i'' = mK_m/A$$

in said equation m being a scaling constant equal to said transfer function from said position command to said angular shaft position, $K_m$ being a counter electromotive force constant characterizing production of a counter electromotive force proportional to said angular shaft speed of said electric motor, and A being a voltage gain of a pulse width modulation control and power stage.

9. The method of claim 8 wherein said equation providing transfer function of said feedforward circuit is physically implemented, thereby implementing said feedforward circuit, as a constant gain circuit.

* * * * *

UNITED STATES PATENT AND TRADEMARK OFFICE
CERTIFICATE OF CORRECTION

PATENT NO. : 4,990,001

DATED : February 5, 1991

INVENTOR(S) : Losic et al

It is certified that error appears in the above-identified patent and that said Letters Patent is hereby corrected as shown below:

Col.2, line 27, change "indirect" to —in direct—.

Col.2, line 43, change "proportionalto" to —proportional to—.

Col.4, line 54, change "$\Delta AT_M(s)$" to —$\Delta T_M(s)$—.

Col.6, lines 26 and 27, change "$\Delta V_{\varepsilon\ell}(s)$" to —$\Delta V_{\varepsilon 1}(s)$—.

Col.6, line 46, change "$\Delta V_{\Delta\ell}(s)$" to —$\Delta V_{\varepsilon 1}(s)$—.

Col.6, line 56, change "a constant Thus, a voltage" to —a constant A. Thus, a voltage—.

Col.7, line 6, change "pulses" to —pulsed—.

Col.7, line 23, change "$K_i''[sec]i$" to —$K_i''[sec]$—.

Col.7, line 54, change "$-\Delta T_1(s)$" to —$-\Delta T_\ell(s)$—.

Col.7, line 66, change "$K_1''=0$" to —$K_i''=0$—.

Col.8, line 15, change "$[-\Delta T_1(s)]$" to —$[-\Delta T_\ell(s)]$—.

Col.8, line 41, change "$T_p(s)=G_R'(s)AK_v+K_m]/[G_R'(s)AK_g K_e K_c K_p$" to —$T_p(s)=[G_R'(s)AK_v+K_m]/[G_R'(s)AK_g K_e K_c K_p]$—.

Col.8, line 48, delete the single appearance of letter "c".

Col.8, line 54, change "+]" to —=[—.

UNITED STATES PATENT AND TRADEMARK OFFICE
CERTIFICATE OF CORRECTION

PATENT NO. : 4,990,001
DATED : February 5, 1991
INVENTOR(S) : Losic et al.

It is certified that error appears in the above-identified patent and that said Letters Patent is hereby corrected as shown below:

Col.10, line 6, change "{(" to —{—.

Col.10, line 12, change "$G_M(s)Z_{ekv}(s)$" to —$G_M(s) \cdot Z_{ekv}(s)$—.

Col.10, line 61, change "A]s}" to —$A/\{[K_m+K_v G_R'(s)A]s\}$—.

Col.13, line 41, change "$A_{ekv}(s)$" to —$Z_{ekv}(s)$—.

Signed and Sealed this

Eighteenth Day of August, 1992

Attest:

DOUGLAS B. COMER

*Attesting Officer*     Acting Commissioner of Patents and Trademarks